(12) United States Patent
Johnson et al.

(10) Patent No.: US 7,991,608 B2
(45) Date of Patent: Aug. 2, 2011

(54) MULTILINGUAL DATA QUERYING

(75) Inventors: Michael R. Johnson, State College, PA (US); Bruce E. Peoples, State College, PA (US)

(73) Assignee: Raytheon Company, Waltham, MA (US)

( * ) Notice: Subject to any disclaimer, the term of this patent is extended or adjusted under 35 U.S.C. 154(b) by 910 days.

(21) Appl. No.: 11/468,853

(22) Filed: Aug. 31, 2006

(65) Prior Publication Data
US 2007/0250493 A1 Oct. 25, 2007

Related U.S. Application Data

(60) Provisional application No. 60/745,144, filed on Apr. 19, 2006.

(51) Int. Cl.
G06F 17/20 (2006.01)
G06F 7/00 (2006.01)
G06F 17/00 (2006.01)

(52) U.S. Cl. ........... 704/9; 704/3; 704/5; 704/8; 704/10; 707/736; 707/757; 715/259; 715/260

(58) Field of Classification Search ............... 704/1–10; 707/4, 736, 757; 715/264, 265, 259, 260
See application file for complete search history.

(56) References Cited

U.S. PATENT DOCUMENTS

| | | | |
|---|---|---|---|
| 5,012,349 A | | 4/1991 | de Fay |
| 5,794,050 A * | | 8/1998 | Dahlgren et al. ............. 717/144 |
| 6,064,951 A * | | 5/2000 | Park et al. ......................... 704/8 |
| 6,260,008 B1 * | | 7/2001 | Sanfilippo ......................... 704/9 |
| 6,349,276 B1 * | | 2/2002 | McCarley ......................... 704/8 |
| 6,360,196 B1 * | | 3/2002 | Poznanski et al. ................ 704/8 |
| 6,389,387 B1 * | | 5/2002 | Poznanski et al. ................ 704/9 |
| 6,424,983 B1 | | 7/2002 | Schabes et al. |
| 6,675,159 B1 * | | 1/2004 | Lin et al. ........................... 707/3 |
| 6,859,778 B1 * | | 2/2005 | Bakis et al. ................... 704/277 |
| 6,871,174 B1 * | | 3/2005 | Dolan et al. ....................... 704/9 |
| 6,996,520 B2 | | 2/2006 | Levin |
| 7,152,031 B1 | | 12/2006 | Jensen et al. |
| 7,243,305 B2 | | 7/2007 | Schabes et al. |
| 7,401,077 B2 | | 7/2008 | Bobrow et al. |
| 7,406,459 B2 | | 7/2008 | Chen et al. |
| 7,870,512 B2 * | | 1/2011 | Misovski ...................... 715/861 |
| 2002/0059289 A1 * | | 5/2002 | Wenegrat et al. ............ 707/102 |
| 2002/0194300 A1 * | | 12/2002 | Lin et al. ....................... 709/217 |
| 2003/0018626 A1 * | | 1/2003 | Kay et al. ......................... 707/3 |
| 2003/0084066 A1 * | | 5/2003 | Waterman et al. .......... 707/104.1 |

(Continued)

OTHER PUBLICATIONS

Mena et al., "Observer: An Approach for query processing in global information systems based on Interoperation across Pre-existing Ontologies," Distributed and Parallel Databases, 2000—Springer.*

(Continued)

*Primary Examiner* — James S Wozniak
*Assistant Examiner* — Edgar Guerra-Erazo
(74) *Attorney, Agent, or Firm* — Daly, Crowley, Mofford & Durkee, LLP

(57) ABSTRACT

In one aspect, a method for multilingual data querying, includes determining a word ontology of a base word in a source language, generating a set of words representing the word ontology of the base word, translating at least a subset of the set of words into a target language and translating the at least a subset of the set of words from the target language into the source language of the base word.

24 Claims, 9 Drawing Sheets

U.S. PATENT DOCUMENTS

| | | | |
|---|---|---|---|
| 2003/0149686 | A1 | 8/2003 | Drissi et al. |
| 2004/0102957 | A1 | 5/2004 | Levin |
| 2004/0153311 | A1* | 8/2004 | Liu et al. .................... 704/10 |
| 2004/0163043 | A1* | 8/2004 | Baudin et al. ................ 715/513 |
| 2004/0172235 | A1* | 9/2004 | Pinkham et al. ................ 704/2 |
| 2004/0225667 | A1 | 11/2004 | Hu et al. |
| 2004/0243557 | A1 | 12/2004 | Broder et al. |
| 2004/0254783 | A1* | 12/2004 | Isahara ............................ 704/9 |
| 2005/0154690 | A1* | 7/2005 | Nitta et al. ..................... 706/46 |
| 2005/0197991 | A1 | 9/2005 | Wray et al. |
| 2005/0278362 | A1* | 12/2005 | Maren et al. .................. 707/100 |
| 2006/0047649 | A1* | 3/2006 | Liang .............................. 707/4 |
| 2006/0184516 | A1* | 8/2006 | Ellis ................................ 707/3 |
| 2007/0011160 | A1* | 1/2007 | Ferland et al. .................. 707/6 |
| 2007/0106499 | A1 | 5/2007 | Dahlgren et al. |
| 2007/0118357 | A1 | 5/2007 | Kasravi et al. |
| 2007/0179776 | A1 | 8/2007 | Segond et al. |
| 2007/0244853 | A1* | 10/2007 | Schneider et al. ............... 707/3 |
| 2008/0077859 | A1 | 3/2008 | Schabes et al. |
| 2008/0262828 | A1 | 10/2008 | Och et al. |

OTHER PUBLICATIONS

Vossen P. EuroWordNet: a multilingual database for information retrieval. In: Proc. of the DELOS workshop on Cross-language Information Retrieval, Mar. 5-7, Zürich, Switzer-land, 1997.*

Maedche et al., (2001), "Ontology Learning for the Semantic Web," IEEE Intelligent Systems 16(2), 72-79.*

Vossen P., "EuroWordNet General Document", Jul. 1, 2002.*

Maedche et al., (2001), "Ontology Learning for the Semantic Web," IEEE Intelligent Systems 16(2), 72-79.*

Vossen P. EuroWordNet: a multilingual database for information retrieval. In: Proc. of the DELOS workshop on Cross-language Information Retrieval, Mar. 5-7, Zurich, Switzerland, 1997.*

Latifur R Khan, "Ontology-based Information Selection", A Dissertation Presented to the Faculty of the Graduate School University of Southern California in Partial Fulfillment of the Requirements for the Degree Doctor of Philosophy, Computer Science, Aug. 2000.*

International Search Report. (Form PCT/ISA/210).

Written Opinion of the International Searching Authority. (Form PCT/ISA/237).

Yoshinaga K et al: "Multi-lingual intelligent information retriever with automated ontology generator" Knowledge-Based Intelligent Information Engineering Systems, 1999. Third International Conference Adelaide, SA, Australia Aug. 31-Sep. 1999, Piscataway, NJ, USA, IEEE, US, Aug. 31, 1999, pp. 62-65, XP010370932 ISBN: 0-7803-5578-4. The whole document.

Wen-Hsiang Lu et al: "Anchor text mining for translation of Web queries" Data Mining, 2001. ICDM 2001, Proceedings IEEE International Conference on San Jose, CA, USA Nov. 29-Dec. 2, 2001, Los Alamitos, CA, USA, IEEE Comput. Soc, US, Nov. 29, 2001, pp. 401-408, XP010583303 ISBN: 0-7695-1119-8. The whole document.

Chung-Hong Lee et al Institute of Electrical and Electronics Engineers: "A multilingual text-mining approach based on self-organizing maps for semantic web mining" IEEE 2002 International Conference on Systems, Man and Cybernetics. (SMC'02). Yasmine Hammamet, Tunesia, Oct. 6-9, 2002, IEEE International Conference on Systems, Man, and Cybernetics, New York, NY : IEEE, US, vol. 7 of 7, Oct. 6, 2002, pp. 455-459, XP010623396 ISBN: 0-7803-7437-1. The whole document.

Written Opinion of the International Searching Authority dated Oct. 30, 2008, PCT/US2007/008900.

File downloaded for U.S. Appl. No. 11/468,856, filed Aug. 31, 2006, file through Apr. 21, 2009, 278 pages.

Lu et al., Anchor Text Mining for Translation of Web Queries: A Transitive Translation Approach, Apr. 2004, ACM, vol. 22, Issue 2, pp. 242-269.

Sadat et al., Learning Bilingual Translations From Comparable Corpora to Cross-language Information Retrieval: Hybrid Statistics-based And linguistics-based Approach, Jul. 2003, Association for computational Linguistics, vol. 11, pp. 57-64.

Australian Office Action dated Dec. 16, 2010 for Australian Patent Application No. 2007240937, 2 pages.

Notification Concerning Transmittal of International Preliminary Report on Patentability (Chapter 1 of the Patent Cooperation Treaty) dated Oct. 30, 2008, PCT/US2007/008900.

Written Opinion of the International Searching Authority dated Oct. 30, 2008, PCT/US2007/008900.

* cited by examiner

Welcome to the POS Sense String Translator - TransSenseReq

Select a Language Pair from the Checkboxes:

| | | | | |
|---|---|---|---|---|
| EN to BP ☐ | EN to FR ☐ | EN to DE ☐ | EN to IT ☐ | EN to ES ☐ |
| EN to KO ☐ | EN to JP ☐ | EN to CN ☒ —133 | EN to TW ☐ | EN to EL ☐ New Tengwar! |
| BP to EN ☐ | FR to EN ☐ | DE to EN ☐ | IT to EN ☐ | ES to EN ☐ |
| KO to EN ☐ | JP to EN ☐ | CN to EN ☐ | TW to EN ☐ | EN to KG ☐ New Klingon! |
| None ☐ | EN to AR ☐ | | | |

— 132 (bracket)

TW = Taiwanese  AR = Arabic
CN = Chinese    ES = Spanish
EN = English
BP = Brazilian Portugese
KO = Korean
JP = Japanese
FR = French
IT = Italian
DE = German sight
secret agent
intelligence officer
intelligence agent
operative

}— 134

[translate] — 136

| Source String | Translated String | Submit? | Source Abbrev | Target Abbrev | Source Lang | Target Lang | Lang Pair | Reversed Source String | Reversed Lang Pair |
|---|---|---|---|---|---|---|---|---|---|
| sight | 视力 | ☐ | en | cn | English | Simplified Chinese | encn | Sight | cnen |
| secret agent | 特务 | ☐ | en | cn | English | Simplified Chinese | encn | Spy | cnen |
| intelligence officer | 情报官员 | ☐ | en | cn | English | Simplified Chinese | encn | Intelligence official | cnen |
| intelligence agent | 间谍 | ☐ | en | cn | English | Simplified Chinese | encn | Spy | cnen |
| operative | 技工 | ☐ | en | cn | English | Simplified Chinese | encn | Artificer | cnen |

[Check All] [Uncheck All]
[Send]

*FIG. 3D*

MULTILINGUAL DATA QUERYING

RELATED APPLICATIONS

This application claims priority to provisional application Ser. No. 60/745,144, entitled "MULTILINGUAL QUERYING," filed Apr. 19, 2006, which is incorporated herein in its entirety. This application is also related to "ENHANCING MULTILINGUAL DATA QUERYING" by inventors Bruce Peoples and Michael Johnson, filed on the same day as this application and further identified by Ser. No. 11/468,856, which also claims priority to the provisional application Ser. No. 60/745,144 and is incorporated herein in its entirety.

TECHNICAL FIELD

The invention relates to querying databases and in particular querying databases across multiple languages.

BACKGROUND

Translating a word from a source language to a target language may not result in a one-to-one correspondence from the word in the source language to a translated word in the target language, because a word in the source language may have different meanings. For example, the word "mole" may mean a skin blemish, an animal in the ground or a spy. In some instances, a word in the source language may have no meaning in the target language. These types of circumstances make it difficult for a user, having little knowledge of a targeted language, to search for information in databases across multiple languages.

SUMMARY

In one aspect, the invention is a method for multilingual data querying, includes determining a word ontology of a base word in a source language, generating a set of words representing the word ontology of the base word, translating at least a subset of the set of words into a target language and translating the at least a subset of the set of words from the target language into the source language of the base word.

In another aspect, the invention is an apparatus for multilingual data querying. The apparatus includes circuitry to determine an ontology of a base word in a source language, generate a set of words based on the ontology of the base word, translate at least a subset of the set of words into a target language and translate the at least a subset of the set of words from the target language into the source language of the base word.

In a further aspect, the invention is an article including a machine-readable medium that stores executable instructions for multilingual data querying. The executable instructions cause a machine to determine an ontology of a base word in a source language, generate a set of words based on the ontology of the base word, translate at least a subset of the set of words into a target language and translate the at least a subset of the set of words from the target language into the source language of the base word.

In a still further aspect, the invention is a system for multilingual data query. The system includes an indexed database, a user interface configured to receive a query containing a base word in a source language selected by a user, a word ontology system configured to generate a set of words based on the base word in a source language, a translator configured to generate a translation of the set of word into a target language and to translate the set of words from the target language to the source language and a processor coupled to the word ontology system, the user interface, the indexed database and the translator. The processor is configured to receive selected words from the set of words from the user interface to search in the indexed database.

DESCRIPTION OF THE DRAWINGS

FIGS. 3A to 3D are exemplary templates used by the SRQE system.

DETAILED DESCRIPTION

Figure 1:
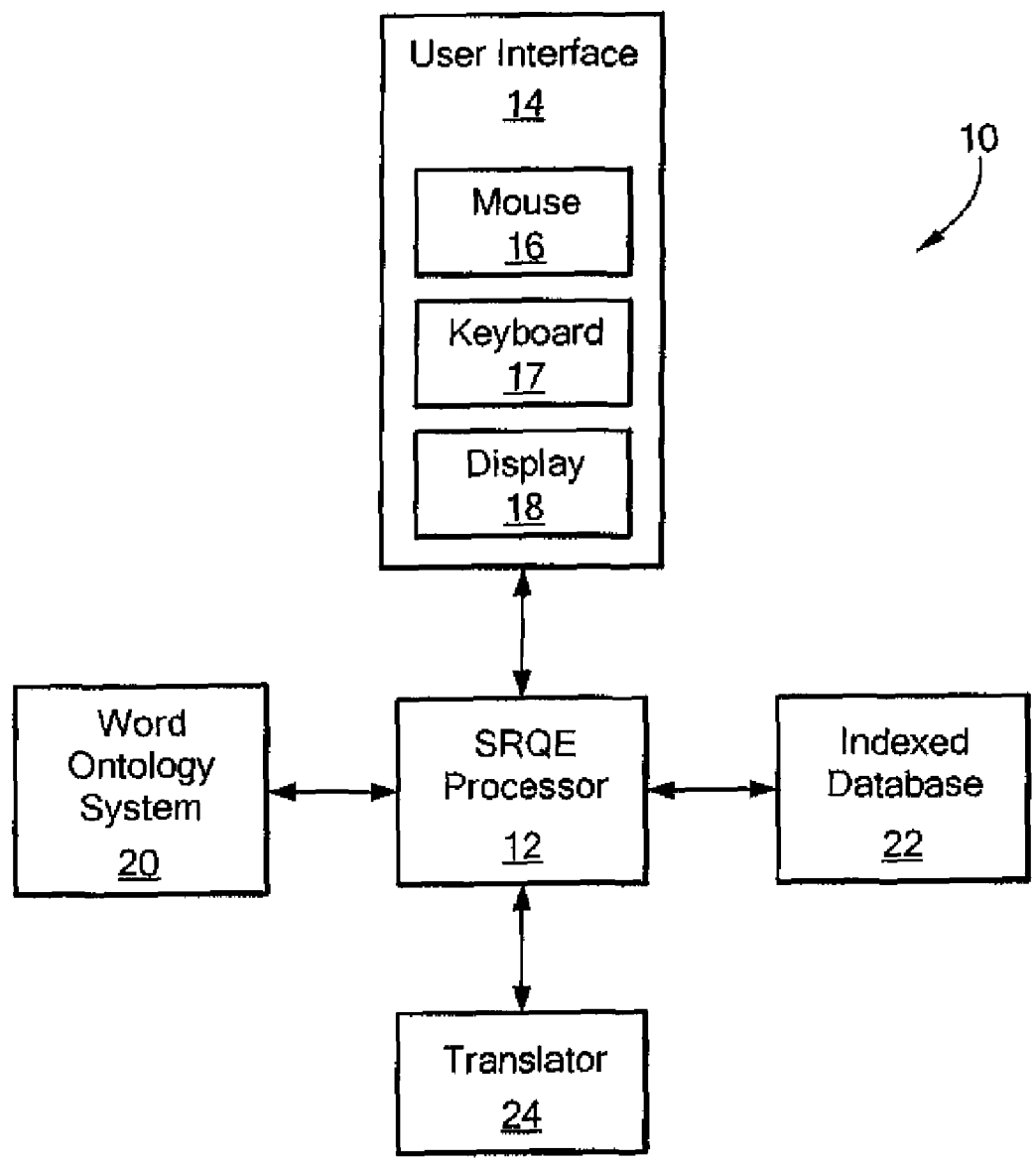
FIG. 1 is a diagram of a semantic reverse query expansion (SRQE) system.
Figure 2:
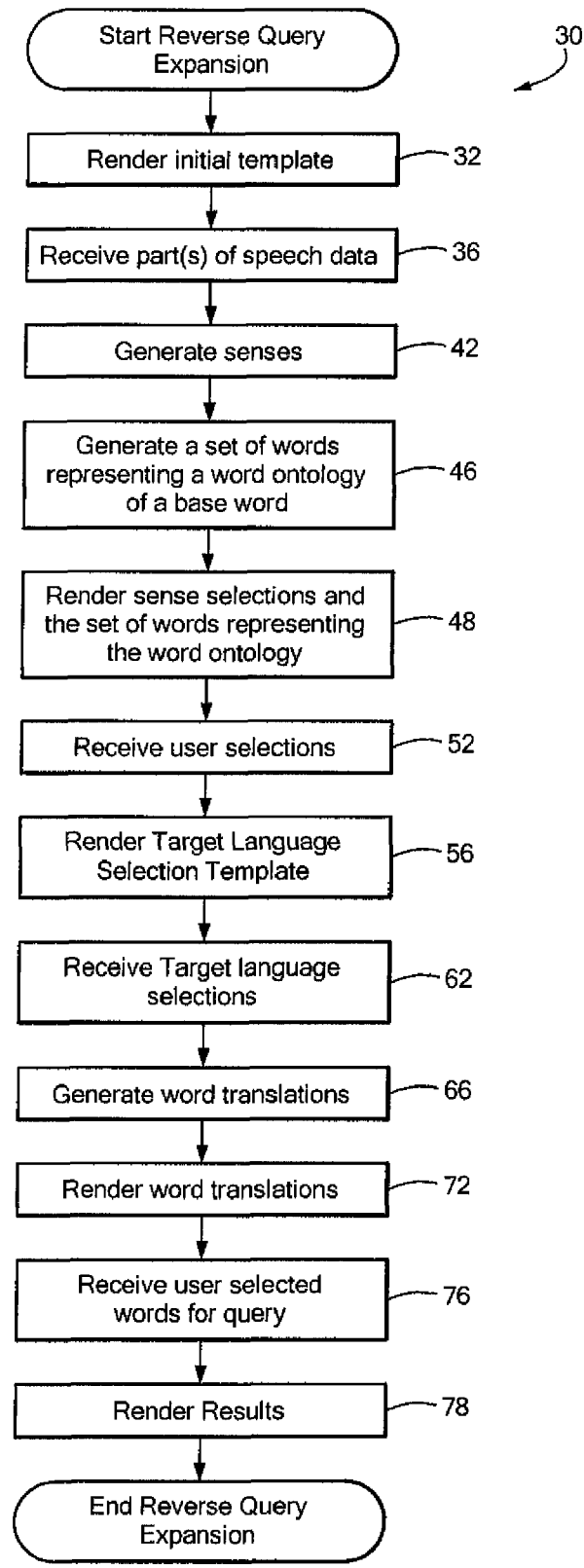
FIG. 2 is a flowchart of a process for semantic reverse query expansion.
Figure 3A:
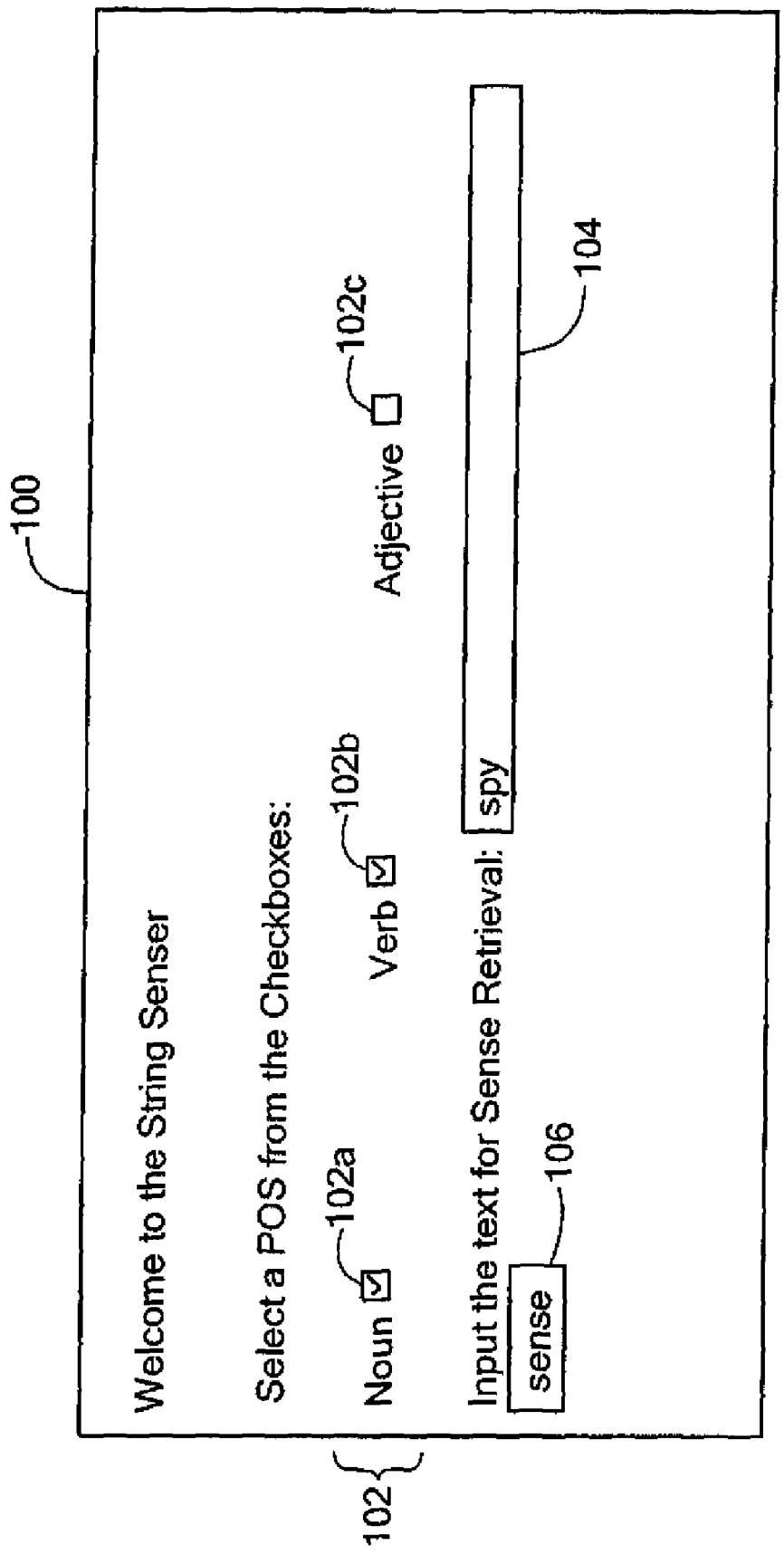
Figure 3B:
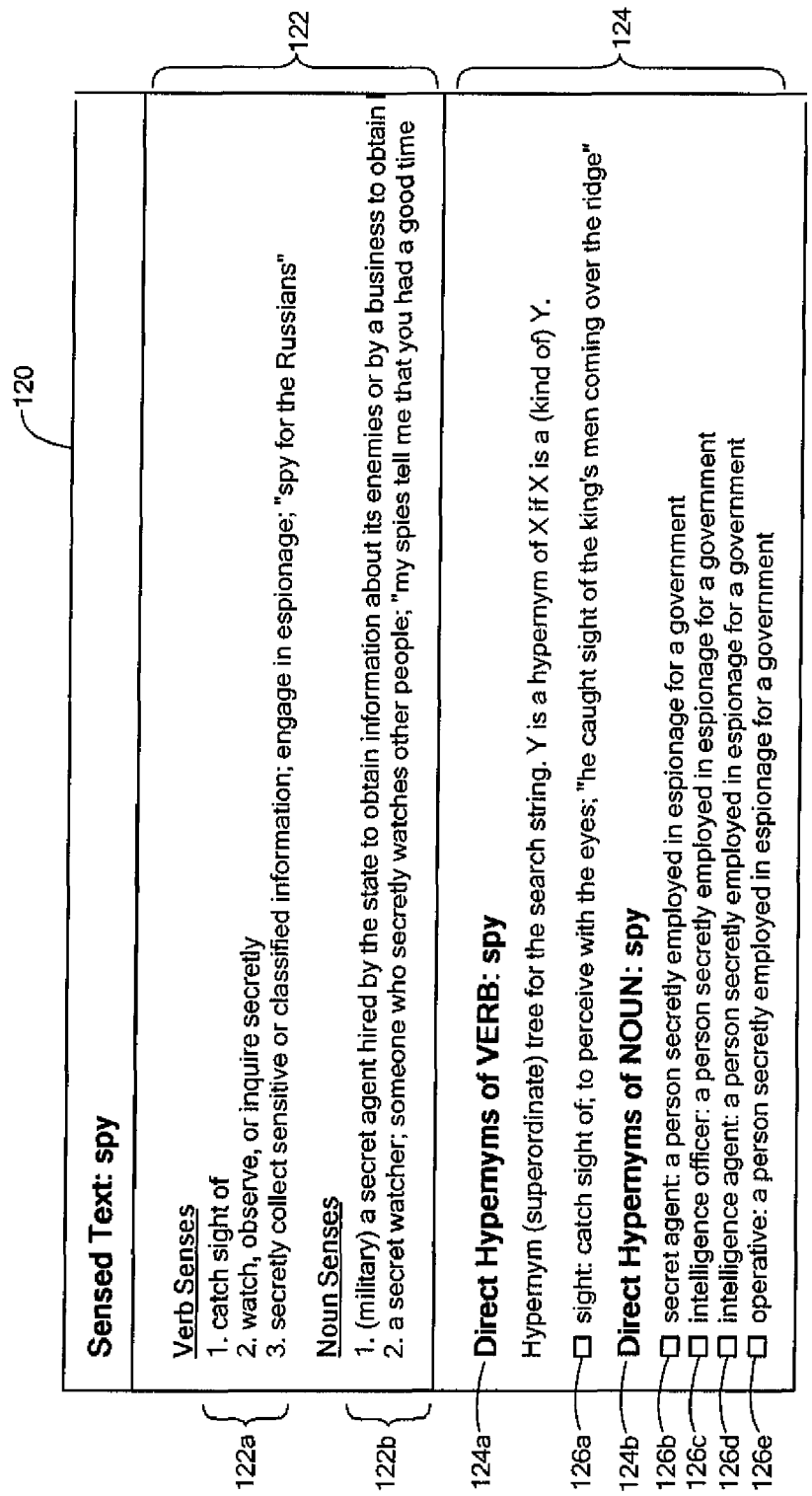

Referring to FIG. 1, a semantic reverse query expansion (SRQE) system 10 includes an SRQE processor 12, a user interface 14 having, for example, a mouse 16, a keyboard 17 and a display 18 (e.g., a monitor, a screen and so forth), a word ontology system 20, an indexed database 22 and a translator 24. The SRQE processor 12 may be a computer or multiple computers.

The word ontology system 20 provides a word ontology of a base word (e.g., a base word is selected by a user and used for retrieval of data from the index database 22) which includes providing synonyms, homonyms, hypernyms and hyponyms, for example, of the base word. A synonym is a word that is the same or identical to the base word. For example, the word "spectacles" is a synonym for "eyeglasses." A homonym is a word that has the same pronunciation or spelling as the base word. For example, a bow means to bend or a bow means a decorative knot. A hypernym is a word that is more generic or broader than the base word. For example, a munition would be a hypernym of bomb. A hyponym is a word that is more specific than the base word. For example, a car would be a hypernym of vehicle. One example of a word ontology system 20 is the WordNet English Language Ontology (Princeton University, Princeton, N.J.).

Figure 4:
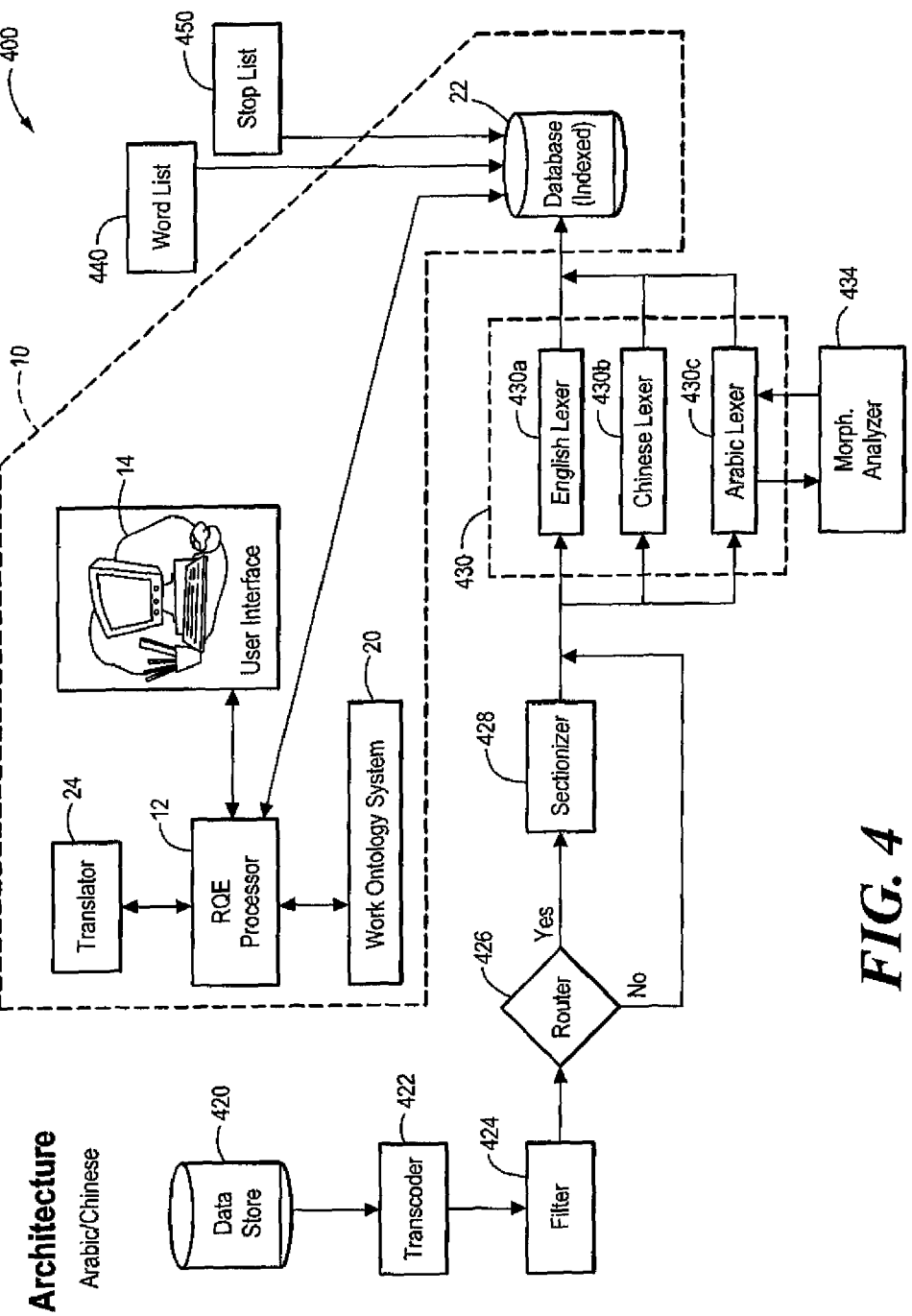
FIG. 4 is a diagram of an exemplary use of the SRQE system.

The indexed database 22 may be populated using various techniques one of which is exemplified in FIG. 4. In one example, the indexed database 22 has a name by which it is referenced by applications and may be manipulated with standard structured query language (SQL) statements. An example of an indexed database is an ORACLE 10g Database (Oracle Corporation, Redwood Shores, Calif.) which has a Text index (e.g., an ORACLE text index). The text index is a database domain index and may be used in generating a query application. For example, a generated Oracle text index of type CONTEXT may be generated and queried with the SQL CONTAINS operator by the SRQE 10. An index is generated from a populated text table and is an index of tokens that relates and refers to documents stored in a database table. In a query application, the index is what the query is performed on. The index contains the tokens to be searched and the pointers to where the text is stored in the indexed database 22. In one example, the text may be a collection of documents. In one example, the text may also be small text fragments.

The translator 24 may be one translation system or a series of translation systems. In one example, translator 24 is a machine translation system, which translates a word in a source language into a word in a target language without human intervention.

Referring to FIGS. 2 and 3A to 3D, an exemplary process for performing a reverse query expansion is a process 30. Process 30 renders an initial template (32). For example, the SRQE processor 12 renders a template 100 on the display 18. The template 100 includes parts of speech (POS) check boxes 102 (e.g., a noun check box 102a, a verb check box 102b and an adjective check box 102c). The template 100 also includes a text box 104 for indicating a base word to be retrieved (e.g., a word selected by the user) and a select button 106 (labeled "sense") for sending a request to the SRQE processor 12.

Process 30 receives parts of speech data (36). For example, a user selects the desired POS check boxes 102 by moving the mouse 16 over the check boxes 102 and clicking the mouse. The user inputs a base word in the text box 104 using the keyboard 17. The user executes the request by clicking the mouse 16 over the select button 106.

Process 30 generates senses (42). For example, in FIG. 3A, the user has selected a noun sense by checking the noun check box 102a and a verb sense by checking the verb check box 102b and entered the word "spy" as the base word in the text box 104. The SRQE processor 12 generates senses for the noun and the verb for the word "spy." A sense represents a meaning of a word based on the POS. The verb senses for spy include, for example, "catch sight of," "watch, observe or inquire secretly" and "secretly collect sensitive or classified information, engage in espionage." In one example, the SRQE processor 12 accesses the word ontological system 20 to determine the senses. In other examples, the senses data may be stored in memory (not shown) in the SRQE processor 12.

Process 30 generates word ontology of the base word (46). For example, SRQE system 12 accesses the word ontology system 20 generates a set of words representing the word ontology of the base word. For example, the set of words may include synonyms, homonyms, hypernyms and hyponyms.

Process 30 renders the senses selections and a set of words representing the word ontology of the base word (48). For example, in FIG. 3B, the SRQE processor 12 renders a template 120. The template 120 includes a senses section 122 and a word ontology section 124.

For example, the senses section 122 includes verb senses section 122a and noun senses section 122b for the base word selected by the user corresponding to the verb and noun parts of speech selected by the user. In another example, the word ontology section 124 includes a verb section 124a and a noun section 124b corresponding to the verb and noun parts of speech selected by the user. In other examples, if the user had selected an adjective part of speech, the senses section would include an adjective sense section (not shown) and the word ontology section would include an adjective section (not shown). While FIG. 3B includes only hypernyms under word ontology section 124, for example, other words from the set of words representing the word ontology may be included.

Verb section 124a and noun section 124b include check boxes 126 (e.g., a check box 126a, a check box 126b, a check box 126c, a check box 126d and a check box 126e) for allowing the user to select which words from the word ontology of the base word that are of interest to the user.

Process 30 receives words selected by a user from the set of words representing the word ontology of the base word (52). For example, the user selects check boxes 126 using the mouse 16, which is received by the SRQE processor 12.

Process 30 renders a target language template 130 to select a source language and a target language (56). For example, in FIG. 3C, the SRQE processor 12 renders the target language template 130 on the display 18. The target language template 130 includes a language pair section 132 which includes language pair check boxes (e.g., an English to Chinese check box 133); a word ontology selection section 134 which reflect the words from the word ontology of the base word selected by the user; and an execute button 136 (labeled "translate"). In the language pair section 132, the first language is the source language and the second language is the target language. For example, check box 133 indicates translating from English (EN) as the source language to Chinese (CN) as the target language.

Process 30 receives the target language selections (62). For example, a user selects the desired language pairs by clicking the mouse 16 over check boxes in the language pair section 132 and sends the request to the SRQE processor 12 by clicking the execute button 136 with the mouse. In FIG. 3C, the English to Chinese check box 133b has been selected.

Process 30 generates word translations (66). For example, the SRQE processor 12 accesses the translator 24 and translates the base word, for example, "spy," into the target language, for example, a Chinese word (characters). In addition, translator 24 also translates the translated word, for example, the Chinese word (characters) back to the source language, English. In one example, the translator 24 may include one translation system translating the word into the target language and a second translation system translating the word back to the source language.

Process 30 renders word translations (72). For example, in FIG. 3D, SRQE processor 12 renders a translation template 140 on the display 18. The translation template 140 includes rows of words selected by the user 142, a translated column 144 representing the word ontology word translated into the target language, a reversed source column 146 representing the translated word translated back to the source language and a submit check box column 148. The template 140 also includes a "check all" button which when clicked by the user with the mouse 16 checks the boxes in the submit check box column 148; and a "uncheck all" button which when clicked by the user with the mouse 16 unchecks the check boxes in the submit check box column 148. The translation template 140 further includes an execute button 160.

Process 30 receives user-selected words for query (76). For example, a user would review the reversed source column 144 to determine if the translated word is meaningful in a user's search. If the translated word is meaningful in the search, the user would check the appropriate check box in the check box column 148 and click the execute button 160 using the mouse 16.

Process 30 renders results (78). For example, the SRQE processor 12 uses the user selected translated words and queries the index database 22 for data. In one example, the results would be returned in the target language translated into the source language by the translator 24. In another example, another translator (not shown) may translate the results from the target language into the source language prior to being transferred to the SRQE processor 12

Referring to FIG. 4, SRQE system 10 may be implemented into a multilingual query system. In one example, a multilingual system 400 for searching Arabic and Chinese data with English as the source language includes the SRQE system 10, which includes the indexed database 22. The multilingual system 400 also includes a data store 420 (e.g., the Internet, a data storage of on-air broadcasts, a data storage of cable broadcast, documents and so forth) a transcoder 422, a filter 424, a router 426, a sectionizer 428, lexers (lexical analyzers) 430 (e.g., a English lexer 430a, a Chinese lexer 430b and an Arabic lexer 430c) and a morphological analyzer 434 coupled, for example, to the Arabic lexer 430c.

The indexed database 22 is populated by extracting data from the data store 420, transcoding the extracted data using the transcoder 422 and filtering the transcoded data using the filter 424. The transcoder 422 converts the data received into a single format. In one example, the transcoder 422 converts electronic text data from one format into another format. For example, the transcoder converts electronic text data for Arabic from encoding formats such as ASMO 449, CODAR-U, ISO 8859-6, Windows 1256 or Arabic-MAC formats to a UTF-8 format.

The router 426 determines whether the filtered data may be sectioned. Filtered data which may be sectioned, for example, mark-up data and hypertext mark-up language (HTML) data and so forth, is sectioned by the sectionizer 428.

The sectioned data and unsectioned data are routed to the database and stored in database tables. To generate the index, the appropriate lexer is selected based on the language of the document set (e.g., English data to the English lexer 430a, Chinese data to the Chinese lexer 430b and Arabic data to the Arabic lexer 430c). The lexers 430 break-up the data received into tokens. For example, a token is used for each letter or each picturegram (e.g., Chinese symbols, Arabic symbols and so forth). In other examples, tokens are used for each word. The lexers 430 populate the index with tokens. The index is stored in the database, generating the indexed database 22. The Arabic lexer 430c uses an Arabic morphological analyzer 434 such as Morfix. The morphological analyzer 434 identifies the root words of the Arabic characters received. In one example, one lexer (e.g., a lexer 430c) is used for each language. In another example, one morphological analyzer is used in conjunction with a lexer for each language.

The index generation process also utilizes word list data 440 and stop list data 450. For example, the word list data 440 includes dictionaries which are utilized in the stemming, and indexing process. For example, the word "running" in English would be associated with the word "run". Run is a result of stemming the word running. In one example, the word list data 440 may be a set of databases, each database representing words and different forms of words in a language. For example, one word list database may include a dictionary of English words and their modified forms utilizing prefixes, such as "soak" and "presoak". Other word list databases might contain English Words and their modified forms utilizing suffixes, such as eat and eating. The stop list data 450 includes linguistic characters that delineate between sentences and/or words to ignore in the indexing process. For example, a period or an exclamation in English would end a sentence and has no value for the index. The period or exclamation point would not be included in the lexer tokenizing process. Another example includes articles such as "a", "an" and "the". Article words have no value in the index. The articles would not be included in the lexer tokenizing process. The stop list data 450 may include a set of stop list databases. For example, each stop list database may be used to represent a set of words or symbols to ignore in the index generation process.

In one example, a lexer (e.g., a lexer 430c), the morphological analyzer 434, the word list 440 and the stop list 450, may be used to tokenize text data of a document in a target language in generating the index. For example, in generating the index from the documents in the database tables, the content of the text data is placed through the stop list 450 to remove useless words such as articles. The morphological analyzer 434 working in conjunction with word list 440, words are converted to root words which are processed by the lexers to become tokens that populate the index.

Figure 5:
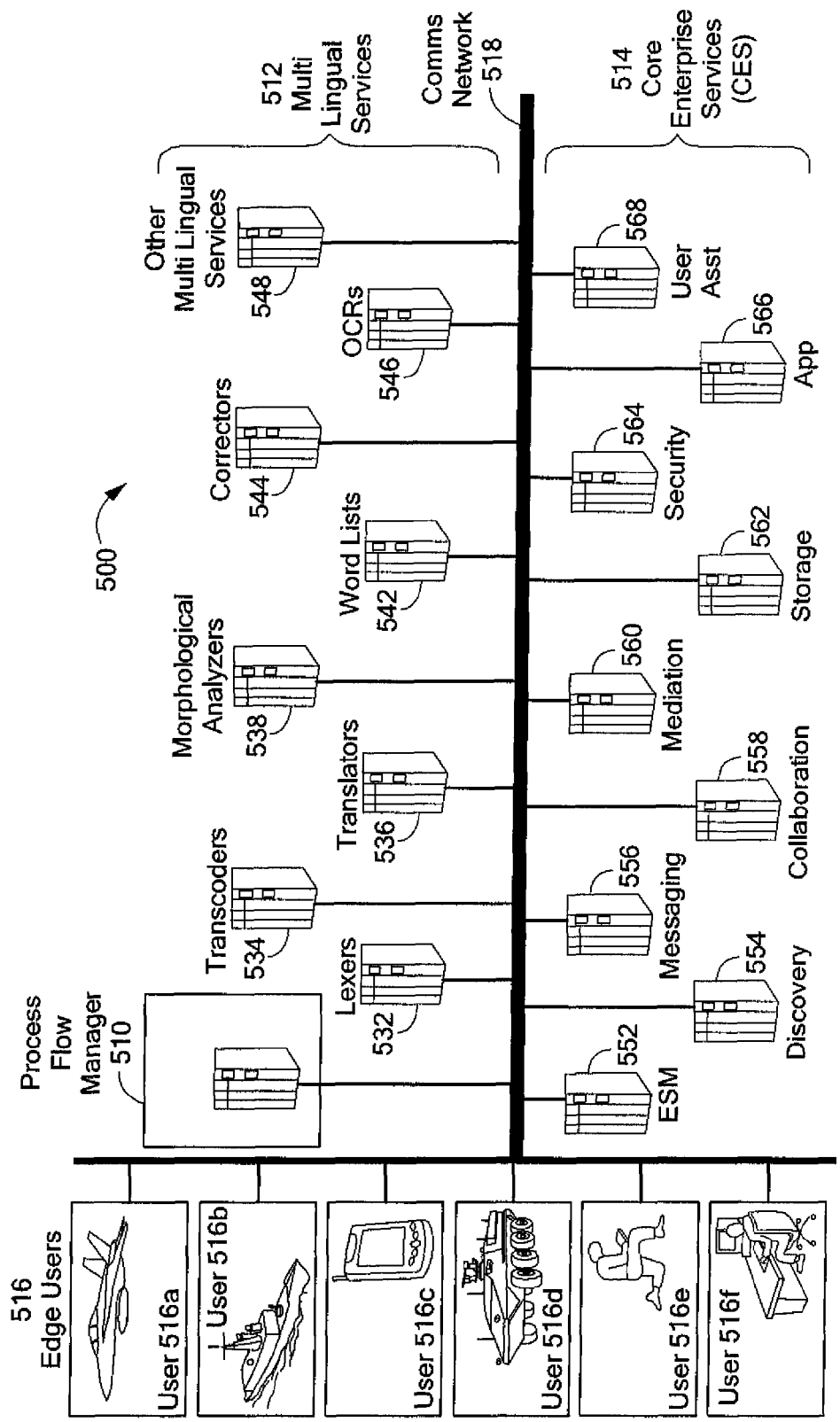
FIG. 5 is a diagram of a multilingual enterprise system (MEMS).

Referring to FIG. 5, the semantic reverse query expansion system 10 may be implemented in a multilingual enterprise management system (MEMS) 500. The MEMS 500 includes a process flow manager 510, multilingual service components 512, core enterprise services (CES) components 514 and users 516 (e.g., a user 516a (in an airplane), a user 516b (in a ship), a user 516c (using a personal data assistant (PDA) device), a user 516d (in a tank), a user 516e (such as an agent in the field) and a user 516f (such as an analyst in an office) coupled together by a communication network 518. The process flow manager 510 enables that a user 516 initiates, performs, and receives enhanced queries by managing process 30.

The multilingual service components 512 include a set of lexers 532, a set of transcoders 534, a set of translators 536, a set of morphological analyzers 538, word lists 542, a set of correctors 544, optical character recognition devices (OCRs) 546 and other multilingual services 548.

In one example, the set of correctors 544 will correct errors in a document such as grammar, spelling and capitalization errors. In another example, the set correctors 544 normalize the type of word from a complex language used for index creation, querying, and translation. For example, Arabic includes several sub-dialects. The set of correctors 544 is used to transform an Arabic sub-dialect into a mainstream form of Arabic, for example, a form a corresponding translator from the set of translators may use. The set of correctors 544 are typically used prior before to index creation, query, and translation by a machine translator to mitigate errors Other multilingual services 548 may include lexers, corpus, taxonomies, dictionaries, stop lists, translators, language identifiers, part of speech identifiers, word disambiguators, extractors, taggers, knowledge bases, agents, speech (spoken word) processors, visual processors, indexers, gisters, semantic interpreters, and various types of language ontological constructs.

The CES components 514 include an enterprise service management (ESM) component 552, a discovery services component 554, a messaging services component 556, a collaboration services component 558, a mediation services component 560, a storage services component 562, a security services component 564, an application services component 566 and a user assistants component 568. The CES components 514 may be used to provide support functions for the process flow manager 510.

In one example, the ESM component 552 includes services that enable life cycle management of the MEMS 500 and supports the performance of activities necessary to operationally manage information flows in the MEMS 500, including the monitoring, management and enforcement of quality of service mechanisms. The ESM component 552 may provide end-to-end enterprise performance monitoring, configuration management, event correlation problem detection/resolution as well as enterprise resource accounting and addressing (e.g., for users, systems, devices). The ESM component 552 may also provide an integrated operational infrastructure management capability for an enterprise and supporting communications equipment. The ESM component 552 provides automated or manual user account and dynamic profile management capabilities. In one example, the ESM component 552 includes an ESM software distribution service (not shown) that verifies all software or documentation to be used in the MEMS 500 has been obtained from authorized sources before use in the MEMS 500.

In one example, the discovery services component 554 includes activities allowing for the discovery of information content or other services, normally through the use of metadata and/or ontological descriptions. The metadata and ontological descriptions are descriptions of data assets such as files, databases, services, directories, web pages, templates, and so forth. The metadata and ontological descriptions are stored in or generated by repositories (not shown) such as registries, directories, or catalogs, for example. In one example, the discovery services component 554 may include a search engine service to query metadata registries. In one example, the process flow manager 510 could interact with the discovery services component 554. For example, the process flow manager 510 may need to utilize the discovery services component 554 to find a specific multilingual service component 512 for use in process 600. The discovery services component may also interact with other service components. For example, the discovery services component 554 interacts with the storage service component 562 and the security service component 564 to provide access to data, metadata and ontological assets once they are discovered.

In one example, the messaging services component 556 supports synchronous and asynchronous information exchange. The messaging services component 556 exchanges information among users or applications on an enterprise infrastructure (e.g., e-mail, fax, message oriented middleware, wireless services, alert services and so forth.). In one example, the messaging services component 55 provides technical services to send, transfer and accept, for example, ontology word data from the WordNet English Language Ontology (Princeton University, Princeton, N.J.). The messaging services component 55 may provide the process flow manager 510 the ability to exchange information among users or applications utilized in process 600.

In one example, the collaboration services component 558 enables individuals and groups to communicate and work together in asynchronous (e-mail, bulletin boards, and so forth.), and synchronous (chat, instant messaging and so forth) settings. The collaboration services component 558 is used for the generation and management of all collaborative workplaces and collaborative sessions in process 600. The workflow of the collaboration service is managed by process flow manager 510. The collaboration services component 558 includes separate and related applications and/or services that facilitate synchronous and asynchronous collaboration activities in a collaborative workplace.

In one example, the mediation service component 560 provides a capability that enables transformation processing: translation, aggregation, and integration of data or services, for example; enables presence and situational support: correlation and fusion of data or services, for example, and enables negotiation: brokering, and trading of data or services for example. Mediation Services may provide mechanisms for mapping interchange formats increasing the ability to exchange information through common methods. In one example, the mediation service component 560 includes an adaptor service for point-to-point communication. The mediation service component 560 may interact with the process flow manager 510. For example, the mediation services component 560 allows the use of an appropriate transcoder 534 for converting encoding formats.

In one example, the storage service component 562 provides physical and virtual places to host data or metadata on a network. The storage service component 562 provides on demand posting, storage, and retrieval of data or metadata with varying degrees of persistence, such as archiving. The storage service component 562 also provides for the continuity of operations and content staging for example, organization and disposition capabilities and processes for data and metadata. In one example, the storage service component 562 may include an archive for process 600 transactions managed by the process flow manager 510. The storage service component 562 may provide the collaboration services component 558 the capability to make available and shareable information to communities of interest (COI) by heterogeneous computers from a single logical data image, anywhere, at any time, with consistent centralized storage management.

In one example, the security services component 564 enables the protection, safety, integrity, and continuity of the MEMS system 500, and the information the MEMS 500 stores, processes, maintains, uses, shares, disseminates, disposes, displays, or transmits. This includes personal information about users, specific content, and the network(s) that make up an information environment such as the SEQE system 10. The security services component 564 allows for the restoration of information systems by incorporating protection, detection and reaction capabilities. In one example, the security services component 564 protects the authentication of a message sent. The security services component 564 may interact with the process flow manager 510 to ensure a secure environment in process 600, for example, when receiving requests 602.

In one example, the application services component 566 includes services which provide, host, operate, manage and maintain a secured network-computing infrastructure. The application services component 566 also provides users or enterprises access over the Internet to applications and related services that would otherwise have to be located in their own personal computer or enterprise computers. In one example, the application services component 566 is a distribution mechanism in providing an enterprise system the applications necessary to monitor and provide load-balancing functions. Working in conjunction with the process flow manager 510, the application services component 566 operates on selecting, sizing, and loading the applications that may operate the SRQE system 10, or are used to administer the multilingual service components 512 (e.g., lexers 532, transcoders 534, translators 536, morphological analyzers 538, word lists 542, correctors 544, OCRs 546, and so forth).

In one example, the user assistant services component 568 provides automated capabilities that learn and apply user preferences and interaction patterns. This information may be used by the process flow manager 510 to assist users in efficiently and effectively utilize resources in the performance of tasks. In one example, the user assistant services component 568 provides automated helper services which reduce the effort required to perform manpower intensive tasks.

The components (e.g., multilingual service components 512 and CES components 514) may represent a number of different components. For example, the correctors 544 may represent several different make and models and types of correctors. Process flow manager 510 ensures that certain components are used based on certain factors.

Figure 6:
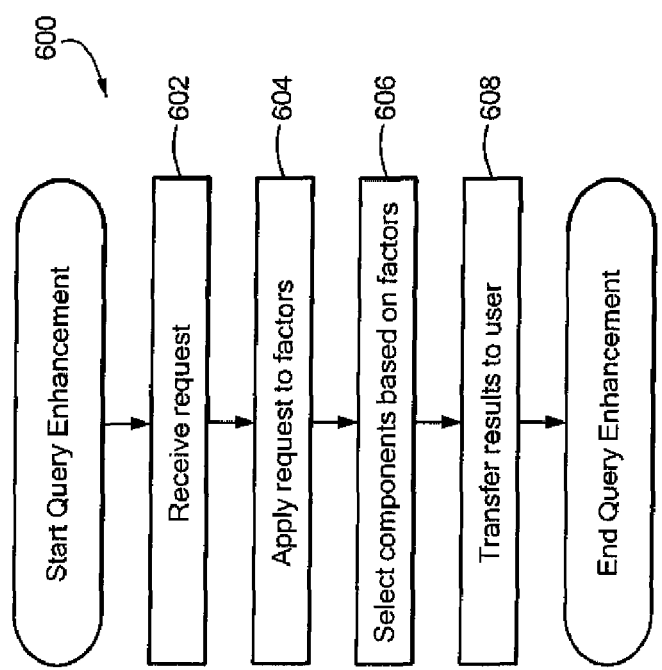
FIG. 6 is a flowchart of a process for enhancing a multilingual database query.

Referring to FIG. 6, the process flow manager 510, working in conjunction with CES 514, may use an exemplary process 600 to enhance queries by the users 512. Process 600 receives a query request (602). For example, the process manager 510 receives a request for linguistic services from one of the users 512 through the communications network 518.

Process 600 applies the request to factors (604). The factors may include language ID, required speed, required quality, user language fluency factor, an interface factor, component availability and a presence of an index. The language ID includes the language to be translated. The required speed includes the amount of time required by the user. A user may designate that search must be completed in 10 seconds, for example.

The required quality may include using an F Score, for example. The F score is the sum of precision and recall divided by two. Precision is the number of good returns divided by the sum of good returns and false alarms. Recall is the number of good returns divided by the sum of good returns and misses.

The user language fluency factor may include a scaled number of proficiency or a simple flag. The interface factor includes the speed of the connection between components (e.g., multilingual service 512 and CES 514). The presence of an index may include the presence of an index for the word being searched in the indexed database 22.

Process 600 selects components based on the factors to process the query (606). For example, the process flow manager 510 determines the process flow and which components (e.g., multilingual service 512 and CES 514) to use to process the query requested by the user and transfer the results of the query to the user.

For example, an analyst in Virginia may receive a result of a query using one process flow and an agent in a hostile zone with the same query may receive a result from the same query but from a different process using different components in MEMS 500 and in some examples a different result.

Process 600 transfers the results to the user (608). In some embodiments, the components, selected from processing block 606, transfer the results to the user without further interaction by the process manager 510. In other examples, the results are processed by the process flow manager 510 for monitoring accuracy and performance of the MEMS 500.

Figure 7:
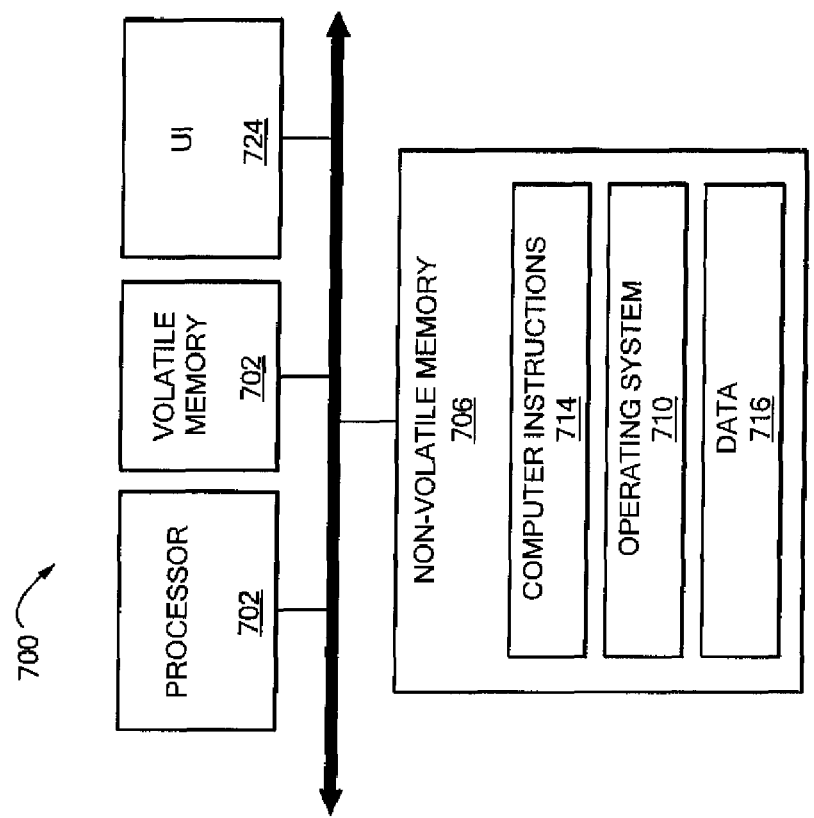
FIG. 7 is a block diagram of a computer system on which the processes of FIGS. 2 and 6 may be implemented.

FIG. 7 shows a computer 700, which may be used to execute the processes herein (e.g., process 30 and process 600). Computer 700 includes a processor 702, a volatile memory 704 and a non-volatile memory 706 (e.g., hard disk). Non-volatile memory 706 includes an operating system 710, data 716 and computer instructions 714 which are executed out of volatile memory 704 to perform the processes (e.g., process 30 and process 600). The computer 700 also includes a user interface (UI) 724 (e.g., the user interface 14 (FIG. 1)).

The processes (e.g., process 30 and process 600) described herein are not limited to use with the hardware and software of FIG. 7; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes described herein and to generate output information.

The system may be implemented, at least in part, via a computer program product, (i.e., a computer program tangibly embodied in an information carrier (e.g., in a machine-readable storage device)), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes. The processes may also be implemented as a machine-readable storage medium, configured with a computer program, where upon execution, instructions in the computer program cause the computer to operate in accordance with a process (e.g., process 30 and process 600).

The processes described herein are not limited to the specific embodiments described herein. For example, the processes are not limited to the specific processing order of FIGS. 2 and 6. Rather, any of the processing blocks of FIGS. 2 and 6 may be re-ordered, combined or removed, performed in parallel or in serial, as necessary, to achieve the results set forth above.

The system described herein is not limited to use with the hardware and software described above. The system may be implemented in digital electronic circuitry, or in computer hardware, firmware, software, or in combinations thereof.

Processing blocks associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

The invention claimed is:

1. A method comprising:
receiving a base word selected by a user using a user interface;
receiving one or more parts of speech of the base word selected by the user using the user interface;
determining a word ontology of the base word in a source language, the word ontology comprising words associated with a part of speech selected by the user if one part of speech is selected by the user, the word ontology comprising words associated with more than one part of speech if more than one part of speech is selected by the user, the word ontology of the base word comprising at least two of a synonym, a homonym, a hypernym and a hyponym of the base word;
generating, in the source language using a processor, a first set of words comprising the word ontology and a definition of each word in the word ontology;

receiving a subset of the first set of words selected by the user using the user interface;

translating the subset of the first set of words selected by the user from the source language into a second set of words in a target language;

translating the second set of words selected by the user from the target language into a third set of words in the source language;

receiving a subset of the second set of words in the target language selected by the user using the user interface after the user observes the third set of words in the source language; and querying, using the processor, the subset of the second set of words.

2. The method of claim 1, further comprising retrieving data from an indexed database based on the selections from the user.

3. An apparatus for multilingual data querying, comprising:

circuitry to:

receive a base word selected by a user using a user interface;

receive one or more parts of speech of the base word selected by the user using the user interface;

determine an ontology of the base word in a source language, the word ontology comprising words associated with a part of speech selected by the user if one part of speech is selected by the user, the word ontology comprising words associated with more than one part of speech if more than one part of speech is selected by the user, the word ontology of the base word comprising at least two of a synonym, a homonym, a hypernym and a hyponym of the base word;

generate, in the source language, a first set of words comprising the word ontology and a definition of each word in the word ontology;

receive a subset of the first set of words selected by the user using the user interface;

translate the subset of the first set of words selected by the user from the source language into a second set of words in a target language;

translate the second set of words selected by the user from the target language into a third set of words in the source language;

receive a subset of the second set of words in the target language selected by the user using the user interface after the user observes the third set of words in the source language; and querying the subset of the second set of words.

4. The apparatus of claim 3 wherein the circuitry comprises at least one of a processor, a memory, programmable logic and logic gates.

5. The apparatus of claim 3, further comprising circuitry to retrieve data from an indexed database based on the selections from the user.

6. An article comprising a non-transitory machine-readable storage medium that stores executable instructions for multilingual data querying, the executable instructions causing a machine to:

receive a base word selected by a user using a user interface;

receive one or more parts of speech of the base word selected by the user using the user interface;

determine an ontology of the base word in a source language, the word ontology comprising words associated with a part of speech selected by the user if one part of speech is selected by the user, the word ontology comprising words associated with more than one part of speech if more than one part of speech is selected by the user, the word ontology of the base word comprising at least two of a synonym, a homonym, a hypernym and a hyponym of the base word;

generate, in the source language, a first set of words comprising the word ontology and a definition of each word in the word ontology;

receive a subset of the first set of words selected by the user using the user interface;

translate the subset of the first set of words selected by the user from the source language into a second set of words in a target language;

translate the second set of words selected by the user from the target language into a third set of words in the source language;

receive a subset of the second set of words in the target language selected by the user using the user interface after the user observes the third set of words in the source language; and query the subset of the second set of words.

7. The article of claim 6 wherein the executable instructions further comprises instructions causing a machine to retrieve data from an indexed database based on the selections from the user.

8. A system for multilingual data query, comprising:

an indexed database;

a user interface configured to:

receive a base word in a source language selected by a user;

receive one or more parts of speech of the base word selected by the user;

receive a subset of a first set of words selected by the user;

receive a subset of a second set of words in a target language selected by the user after the user observes a third set of words in the source language;

a word ontology system configured to determine a word ontology of the base word in a source language, the word ontology comprising words associated with a part of speech selected by the user if one part of speech is selected by the user, the word ontology comprising words associated with more than one part of speech if more than one part of speech is selected by the user, the word ontology of the base word comprising at least two of a synonym, a homonym, a hypernym and a hyponym of the base word;

a translator configured to:

translate the subset of the first set of words selected by the user from the source language into the second set of words in the target language; and translate the second set of words selected by the user from the target language into the third set of words in the source language;

and a processor coupled to the word ontology system, the user interface, the indexed database and the translator, the processor configured to query the subset of the second set of words.

9. The system of claim 8 further comprising:

a data store;

a transcoder coupled to the data store; and a lexer coupled to the indexed database and the transcoder, wherein the data store, the transcoder and the lexer are configured to populate the indexed data base.

10. The system of claim 9 further comprising a morphological analyzer coupled to the lexer.

11. The system of claim 8 wherein the lexer is a lexer of the target language.

12. The system of claim 8 wherein the lexer is a lexer of the source language.

13. The method of claim 1, further comprising rendering a template to a user using the user interface, the template being configured to receive the base word from the user and configured to allow the user to select more than one part of speech.

14. The method of claim 1, rendering in a template the first set of words using the user interface, the template being configured to allow the user to select the subset of the first set of words.

15. The method of claim 1, further comprising rendering in a template the second set of words with the third set of words using the user interface; the template being configured to allow the user to select the subset of the second set of words.

16. The apparatus of claim 3, further comprising circuitry to render a template to a user, the template being configured to receive the base word from the user and configured to allow the user to select more than one part of speech.

17. The apparatus of claim 3, further comprising circuitry to render in a template the first set of words, the template being configured to allow the user to select the subset of the first set of words.

18. The apparatus of claim 3, further comprising circuitry to render in a template the second set of words with the third set of words; the template being configured to allow the user to select the subset of the second set of words.

19. The article of claim 6, further comprising instructions to cause the machine to render a template to a user, the template being configured to receive the base word from the user and configured to allow the user to select more than one part of speech.

20. The article of claim 6, further comprising instructions to cause the machine to render in a template the first set of words, the template being configured to allow the user to select the subset of the first set of words.

21. The article of claim 6, further comprising instructions to cause the machine to render in a template the second set of words with the third set of words; the template being configured to allow the user to select the subset of the second set of words.

22. The system of claim 8 wherein the user interface is configured to render a template to a user, the template being configured to receive the base word from the user and configured to allow the user to select more than one part of speech.

23. The system of claim 8 wherein the user interface is configured to render in a template the first set of words, the template being configured to allow the user to select the subset of the first set of words.

24. The system of claim 8 wherein the user interface is configured to render in a template the second set of words with the third set of words; the template being configured to allow the user to select the subset of the second set of words.

* * * * *